United States Patent
Sugimura

[11] Patent Number: 5,606,996
[45] Date of Patent: Mar. 4, 1997

[54] BLADDER AND ACCUMULATOR USING THE SAME

[76] Inventor: Nobuyuki Sugimura, 3-27 Mabasekita, Shimizu-shi, Shizuoka-ken, Japan

[21] Appl. No.: 634,687

[22] Filed: Apr. 18, 1996

Related U.S. Application Data

[63] Continuation of Ser. No. 248,603, May 25, 1994, abandoned.

[30] Foreign Application Priority Data

Jun. 28, 1993 [JP] Japan ................... 5-181977

[51] Int. Cl.⁶ .................................................. F16L 55/04
[52] U.S. Cl. ................................... 138/30; 138/26
[58] Field of Search ........................ 138/30, 26, 31; 220/721

[56] References Cited

U.S. PATENT DOCUMENTS

| | | | |
|---|---|---|---|
| 3,368,586 | 2/1968 | French et al. | 138/30 |
| 3,500,866 | 3/1970 | Greer | 138/30 |
| 3,592,360 | 7/1971 | Aleck | 138/30 |
| 3,847,182 | 11/1974 | Greer | 138/30 |
| 4,321,949 | 3/1982 | Mercier | 220/721 |
| 4,628,964 | 12/1986 | Sugimura et al. | 138/30 |
| 4,714,093 | 12/1987 | Kawano | 138/30 |
| 4,723,577 | 2/1988 | Wusterbarth | 220/721 |
| 4,784,182 | 11/1988 | Sugimura | 138/30 |
| 4,793,381 | 12/1988 | Sugimura | 138/30 |
| 5,215,124 | 6/1993 | Hattori et al. | 138/30 |

*Primary Examiner*—David Scherbel
*Assistant Examiner*—James F. Hook
*Attorney, Agent, or Firm*—Wood, Phillips, Van Santen, Clark & Mortimer

[57] ABSTRACT

A mounting flange is formed at the opening of the bladder formed into the shape of a bag from elastic material such as rubber; and a thin wall section is formed to prevent stress concentration near the base of the mounting flange.

18 Claims, 8 Drawing Sheets

BLADDER AND ACCUMULATOR USING THE SAME

This application is a continuation of application Ser. No. 08/248,603 filed on May 25, 1994, now abandoned.

BACKGROUND OF THE INVENTION

1. Field of the Invention

The present invention relates to a bladder and an accumulator using the same, and, in particular, to such an accumulator of the type provided with a thin wall section which prevents the concentration of stress produced near the base of the bladder mounting flange, and reliably prevents variable stress from being exerted on the mounting flange base, such that the problem of the thin wall section allowing gas to pass through does not arise.

2. Description of the Related Art

Figure 7:
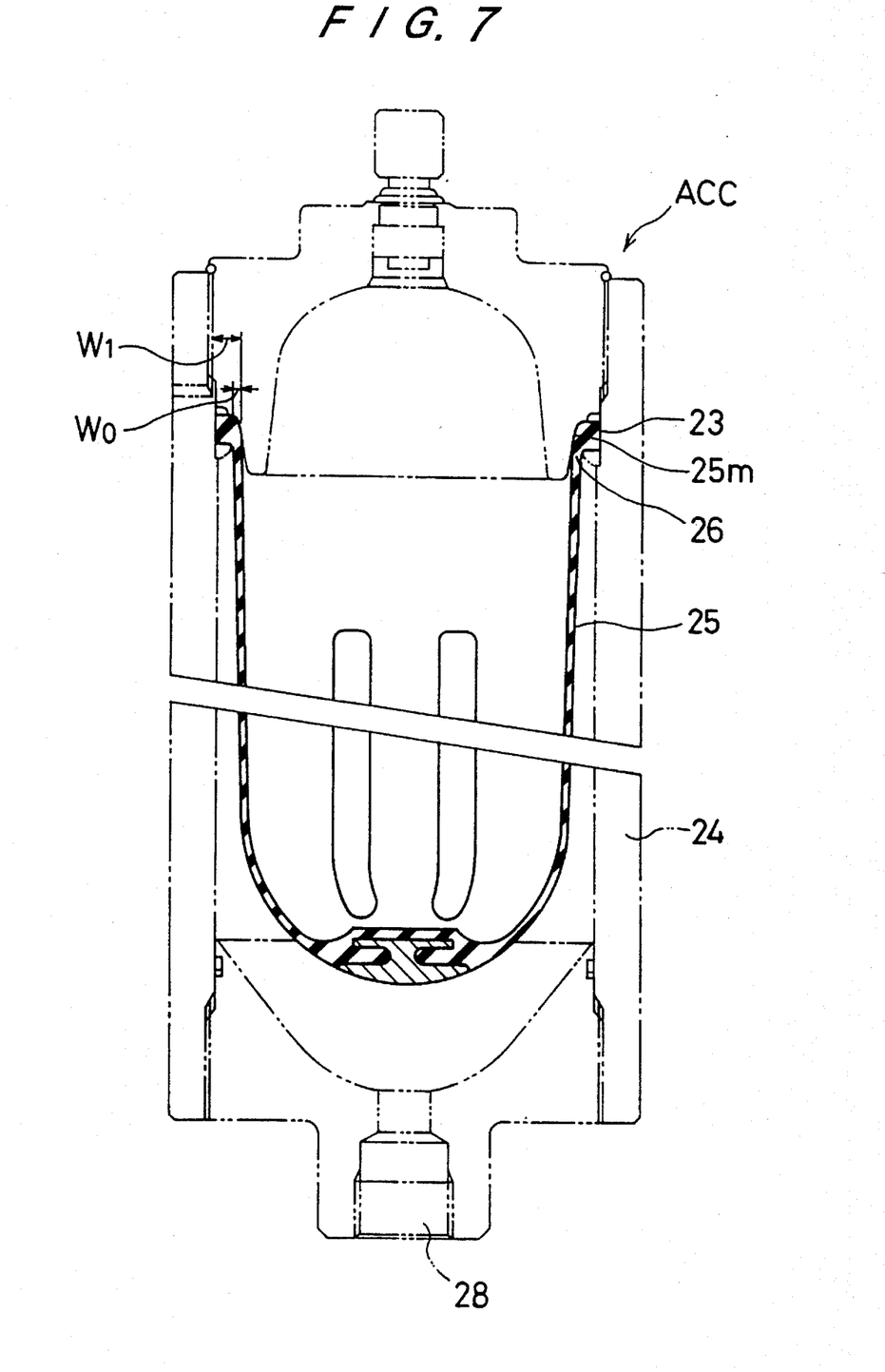
FIG. 7 is a vertical sectional view illustrating a conventional example.
Figure 8:
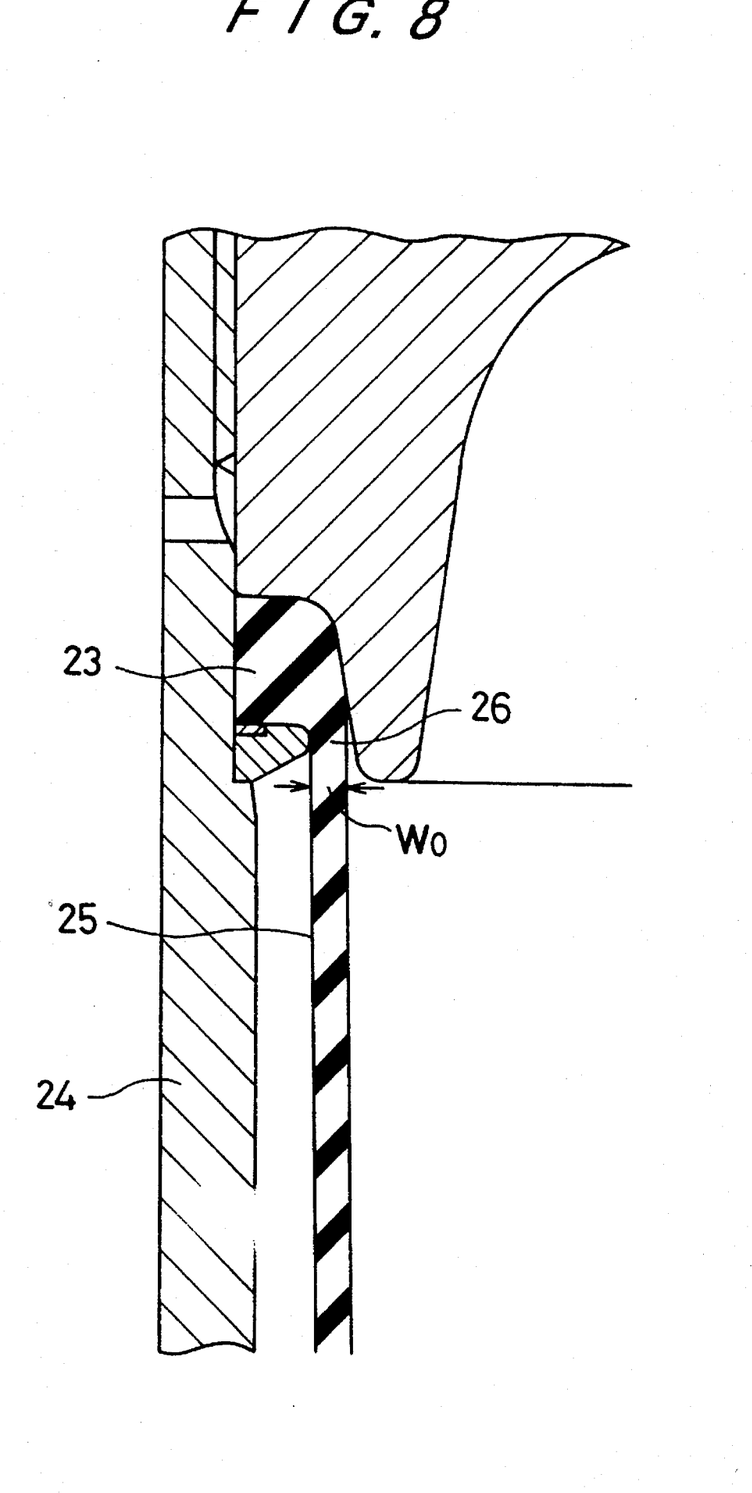
FIG. 8 is an enlarged vertical sectional view of the critical portion of FIG. 7.

As shown in FIG. 7, a conventional accumulator bladder is formed from elastic material, such as rubber, into the shape of a bag, with a mounting flange 23 provided along an opening 25m. The bladder 25 is air-tightly attached to a container main body 24 by means of the flange 23. As shown in FIG. 8, the bladder 25 is formed to an overall thickness equivalent to the thickness of a base 26 of the mounting flange 23, $W_0$, and the thickness of the flange 23, $W_1$, is made larger than the above-described base 26 thickness, $W_0$.

When accumulated liquid in the container main body 24 is discharged from an opening 28 at a high speed, the bladder 25 expands rapidly, so that a variable stress is exerted on the base 26 of the mounting flange 23.

This often results in breaking of the base 26 of the mounting flange 23 of the bladder 25 due to fatigue.

It is thought that this problem may be overcome by forming the bladder into one having a larger overall thickness than the the base 26 of the mounting flange 23 (having a thickness of $W_0$).

However, although this prevents variable stress from being exerted on the base 26, it gives rise to the problem of increased gas transmission.

Consequently, sealed gas leakage occurs, which results in reduced capacity of the accumulator ACC within a short period of time.

SUMMARY OF THE INVENTION

To these ends, the present invention intends to prevent breaking of the bladder resulting from fatigue which is caused by stress concentration, and to prevent gas transmission.

The bladder of the present invention has a thin wall section which is formed to prevent stress concentration around the base of the mounting flange.

DESCRIPTION OF THE PREFERRED EMBODIMENTS

The embodiments of the invention will be described with reference to FIGS. 1 through 6.

Figure 1:
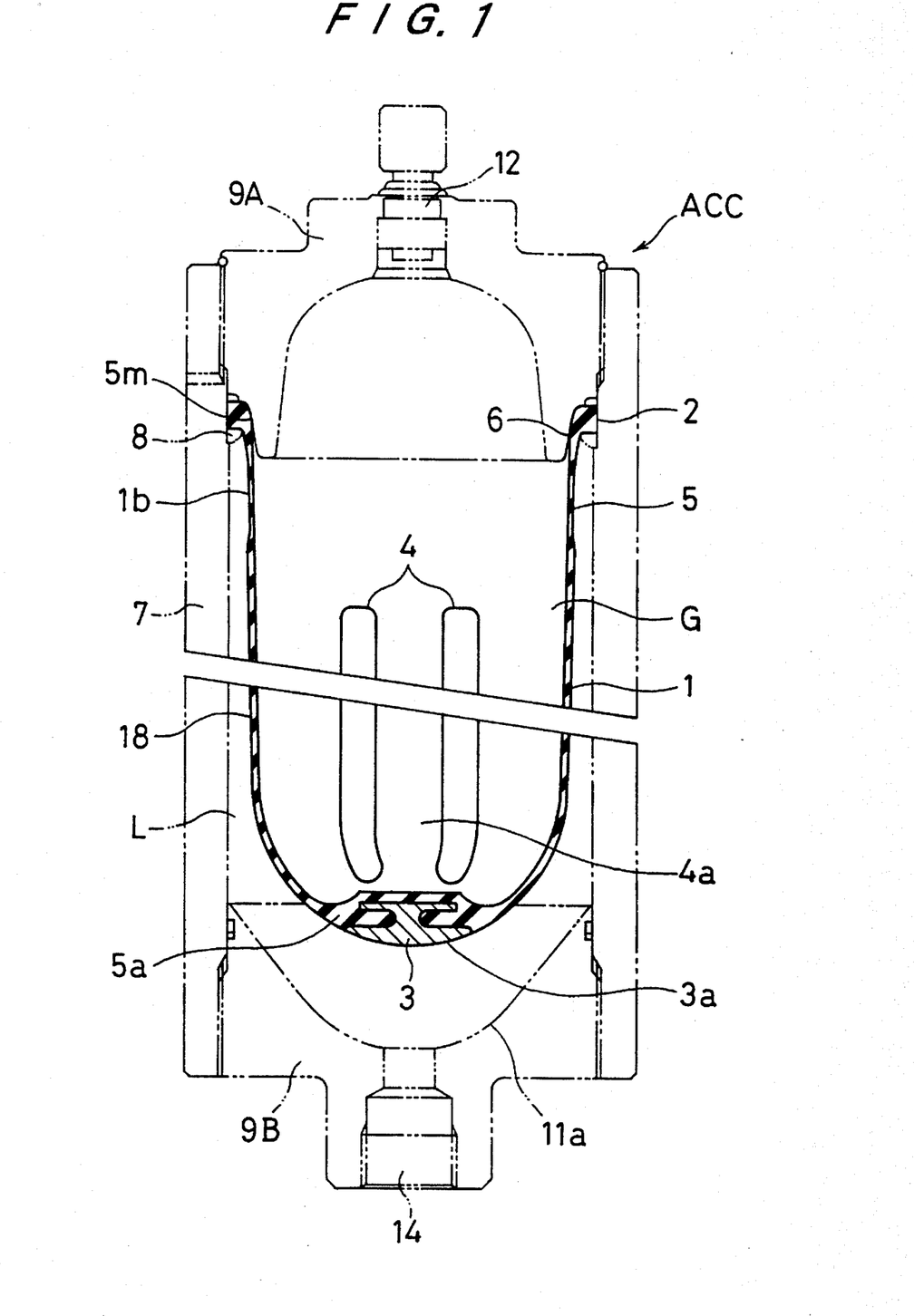
FIG. 1 is a vertical sectional view illustrating an embodiment of the present invention.
Figure 2:
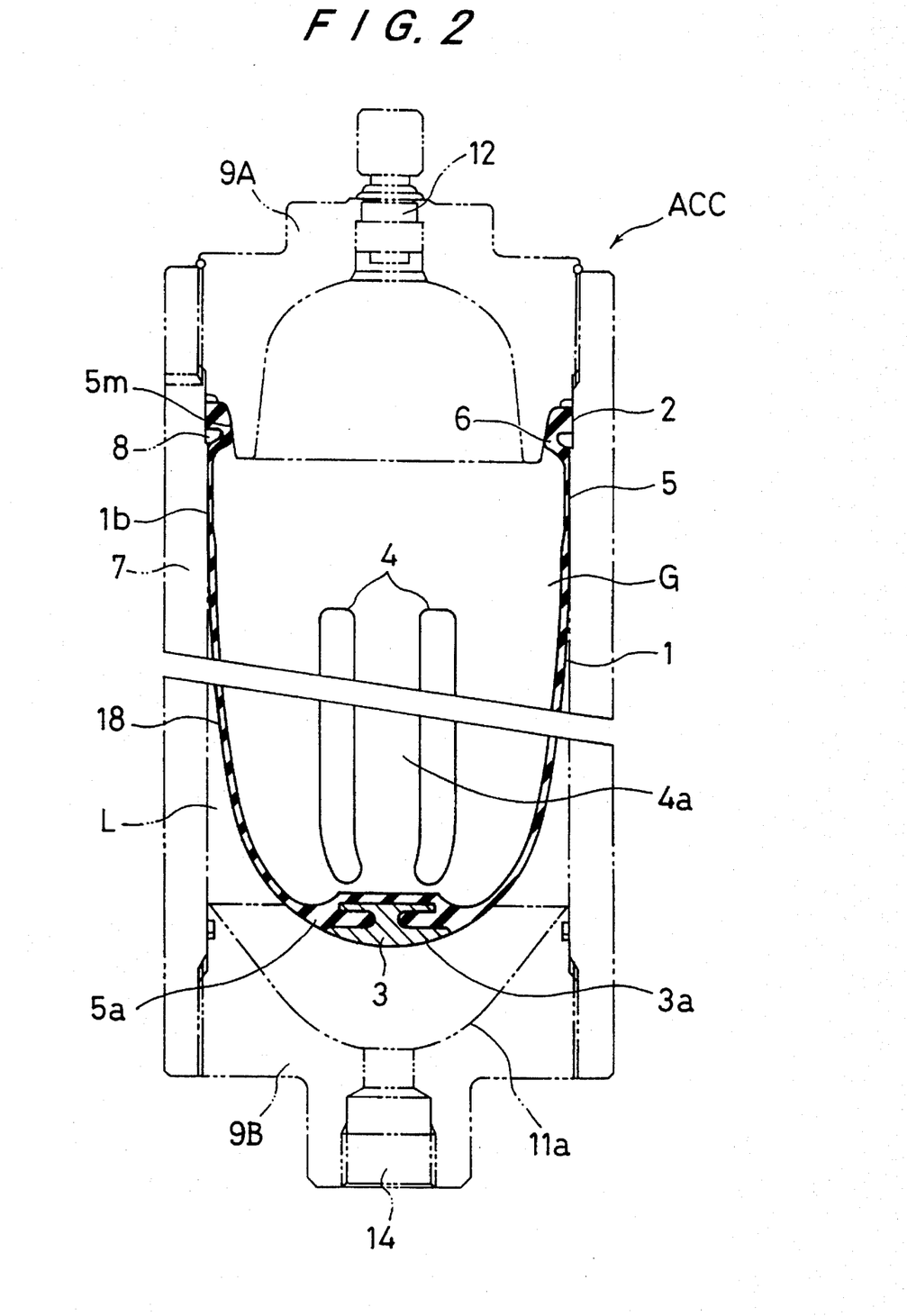
FIG. 2 is a vertical sectional view illustrating an expanded bladder.
Figure 3:
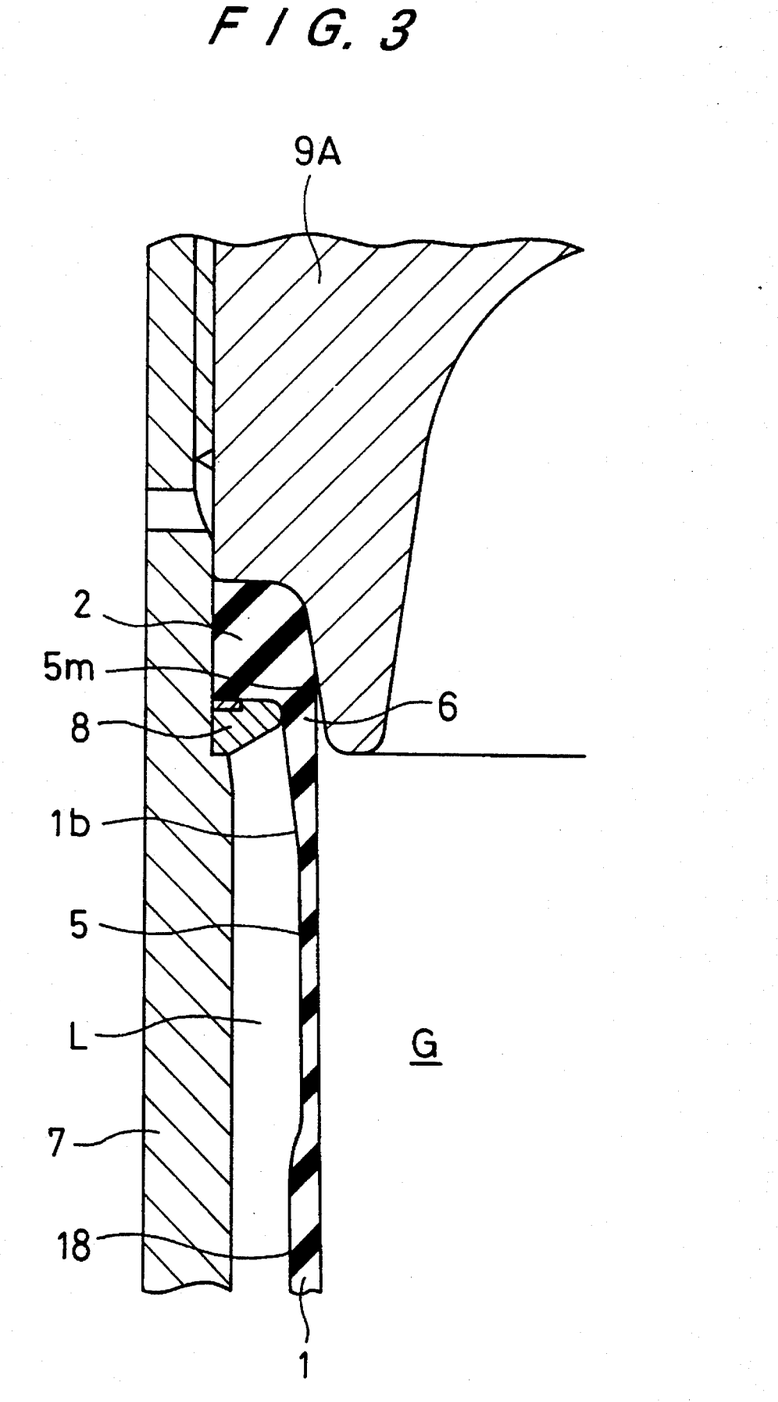
FIG. 3 is an enlarged view showing the critical portion of FIG. 1.
Figure 4:
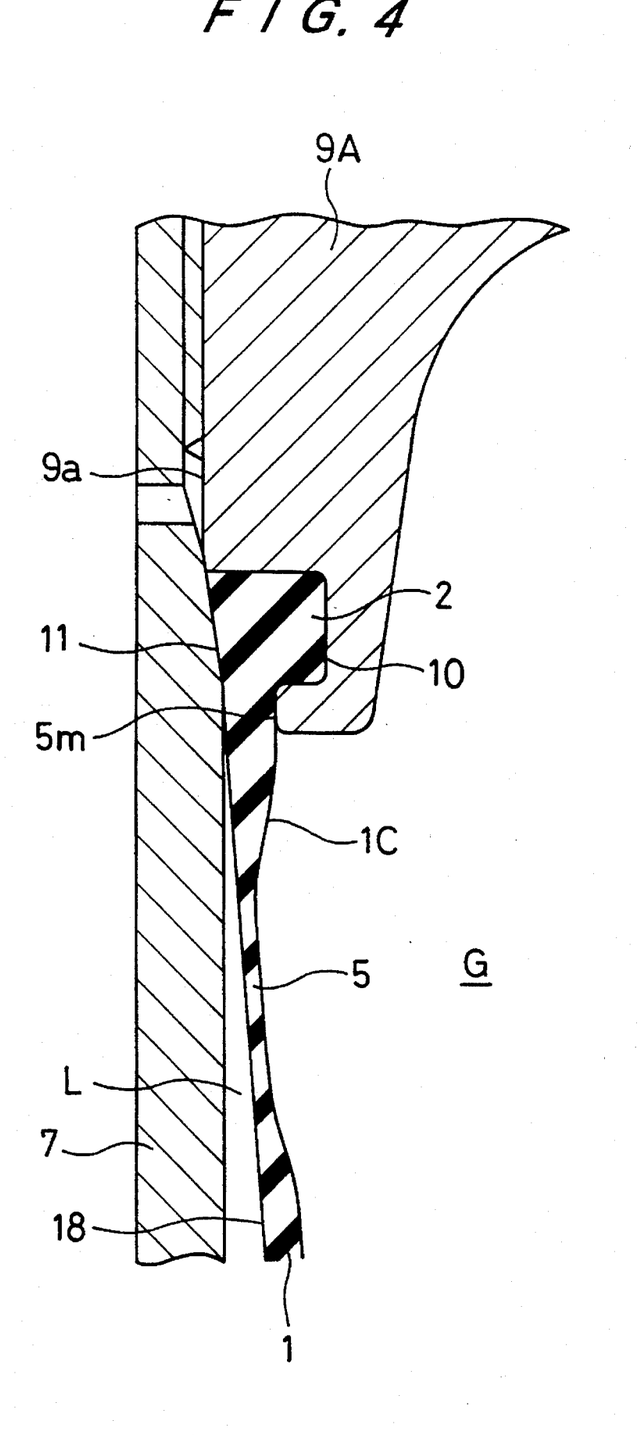
FIG. 4 is a vertical sectional view illustrating another embodiment which corresponds to FIG. 3.

Reference numeral 1 denotes a bladder for preventing stress concentration, which, as shown in FIG. 1, is naturally formed into the shape of a bag, with its opening 5m provided with a flange 2, which is capable of sealing. The flange 2 may be formed along the outer side, 1b, of the bladder 1, as shown in FIGS. 1 and 3, or along the inner side, 1c, of the bladder 1, as shown in FIGS. 2 and 4. A valve body 3 is embedded and fixed centrally and below the bottom surface 5a of the bladder 1. The bottom surface 3a of the valve 3 is curved, the curved bottom surface 3a having a curvature equal to the curvature of the bottom surface 3a of the valve body 3. As shown in FIG. 1, the bladder 1 is a so-called pleated bladder which is regularly folded in, with its inner periphery side provided with longitudinal ridges 4 having a larger thickness than standard thickness A, the longitudinal ridges 4 being spaced at a predetermined interval. As a result of the difference in thickness between the longitudinal ridges and a portion 4a located between the longitudinal ridges, the bladder 1, which contracts in the direction of the diameter, has its shape limited to a bow, a delta, and the like, which allows the bladder to change shape smoothly.

Figure 5:
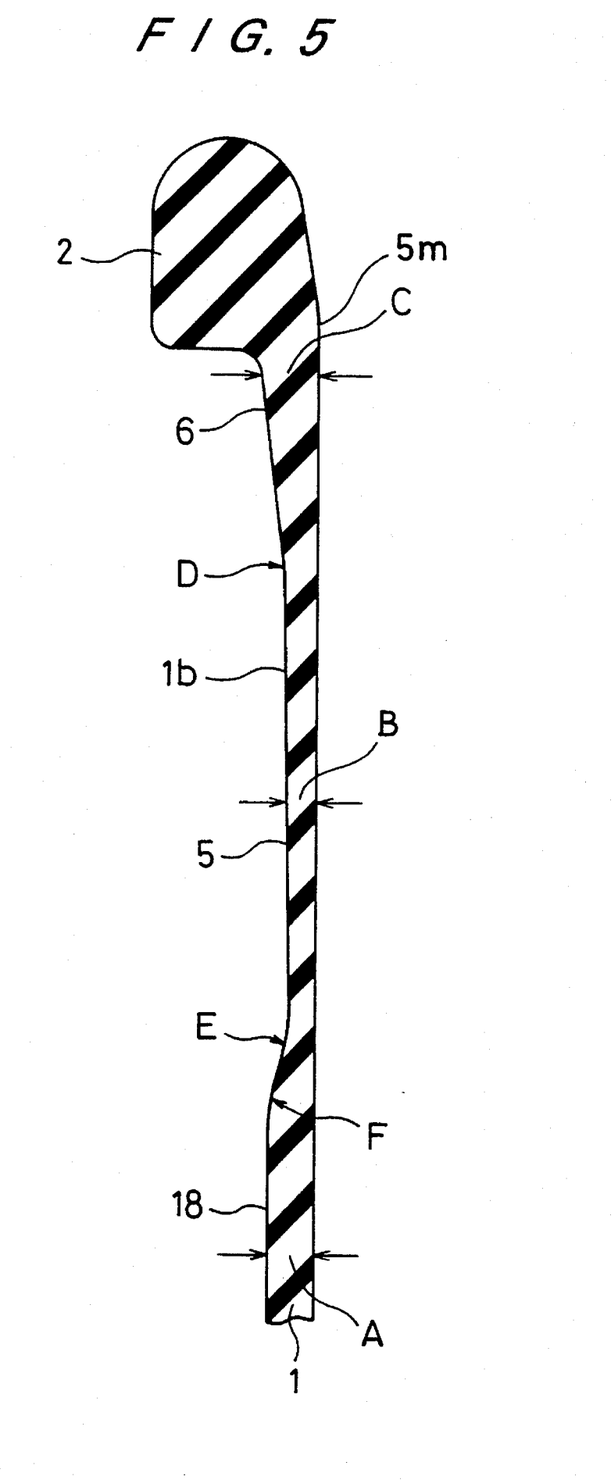
FIG. 5 is an enlarged vertical sectional view of the critical portion of an embodiment, in which a thin wall section is formed by depressing the outer side of the bladder, the Figure corresponding to FIG. 3.
Figure 6:
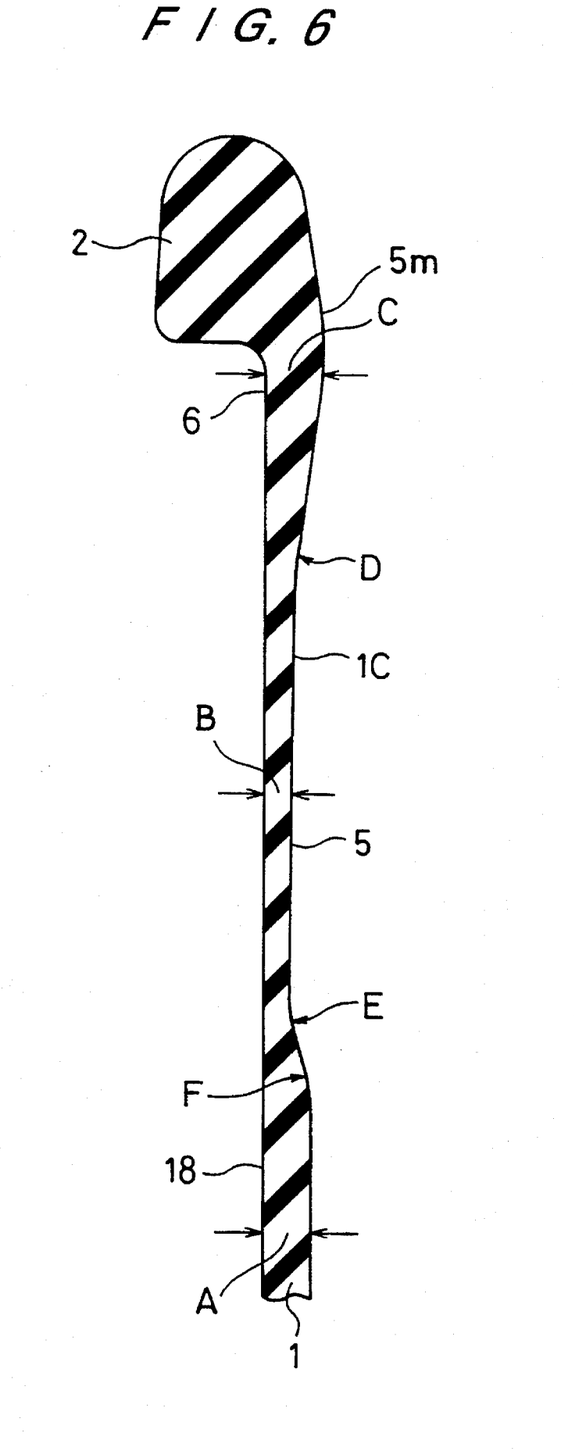
FIG. 6 is an enlarged vertical sectional view of the critical portion of an embodiment, in which a thin wall section is formed by depressing the inner side of the bladder, the Figure corresponding to FIG. 5.

Reference numeral 5 denotes a thin wall section for preventing stress concentration, which is provided along a portion around the mounting flange 2 of the above-described bladder 1. As shown in FIGS. 1 through 6, the thin wall section 5 has a thickness which is less than both the thickness of the base 6 of the mounting flange 2, C, and that of a standard thickness portion 18 of the bladder 1. Although the thin wall section 5 is formed by depressing the outer side, 1b, of the bladder 1, as shown in FIGS. 1, 3, and 5, it may also be formed by depressing the inner side, 1c, of the bladder 1, as shown in FIGS. 4 and 6, or by depressing both the inner and outer sides thereof, which is not shown. As shown in FIG. 2, when the thin wall section 5 expands toward the outer side, it comes into close contact with the container main body 7, which produces an enormous frictional force with the container main body 7, with the result that the downward tensile stress is not transmitted to the base 6 of the mounting flange 2. As illustrated in FIGS. 5 and 6, when the thickness of the standard thickness portion 18 of the bladder 1, that is, the standard thickness is assumed to be A, the thickness of the thin wall section 5 to be B, the thickness of the base 6 of the mounting flange to be C, the radius of curvature of the curved section between the thin wall section 5 and the base 6 of the flange 2 to be D, and the radius of curvature of the curved section between the thin wall section 5 and the standard thickness portion 18 to be E, F, preferable results are obtained when the relationship of the thin wall section 5 of the bladder 1 and the other portions is:

B<0.65A, C>A, D>5A, E>5A, F>5A.

Reference numeral 7 denotes a container body of the accumulator ACC, which internally accommodates the above-described bladder 1. When the mounting flange 2 of the bladder 1 is formed along the outer side, 1b, the flange 2 is supported by a step section 8 placed in the inner periphery of the body 7, or, as shown in FIG. 4, when the mounting flange 2 is formed along the inner side, the flange 2 is supported by a mounting groove 10 provided on an outer periphery, 9a, of a top cover body 9A so that the top cover body 9A engages with the top of the container main body 1.

In the former case, the top cover body 9A and the step section 8, and in the latter case, the top cover body 9A and the oblique face of the container main body 7 nip the mounting flange 2, thereby allowing the bladder 1 to be airtightly and firmly mounted to the container main body 7. The bladder 1 divides a gas chamber G located at the inner side thereof, and a liquid chamber, L, located at the outer side thereof. Nitrogen gas and the like is supplied from an air supply valve 12, which is attached to the foregoing top cover body 9A, is sealed in the foregoing gas chamber G. The supplying and discharging mouth 14 formed in a bottom cover body 9B, which engages with the lower portion of the container main body 7, allows pressure liquid to enter and leave the liquid chamber L, which permits the accumulation and buffering, and the like of the pressure liquid.

As shown in FIG. 1, the bladder illustrated in the above-described embodiment is attached to the container main body 7 to constitute an accumulator. As is well known, it seals the nitrogen gas and the like supplied from the gas supply valve 12 to the gas chamber G located on the inner side of the bladder 1. When liquid is sent into the liquid chamber L from the supplying and discharging mouth 14, the bladder is compressed so that a required amount of the pressure liquid accumulates in the liquid chamber L.

The accumulated liquid is discharged by the expansion of the gas in the bladder 1.

When the accumulated liquid is discharged from the supplying and discharging mouth 14 at a high speed, the bladder 1 expands rapidly as a result of internal gas pressure. The bladder 1 expands, first, from the thin wall section 5 near the mounting flange 2 in the direction of the circumference, so that it comes into close contact with the inner surface of the container main body 7, as shown in FIG. 2. Then, it extends in the axial direction, that is, toward the supplying discharging mouth side 14, where the faster the discharging speed the more the whole bladder will be extended.

When the bladder is extended toward the supplying and discharging mouth 14 side, as described above, it is extended from the portion where the total frictional and tensile forces is smallest. The frictional force of the thin wall section 5 is larger than that of the other portion 18, so that it is constantly retained by the container main body. This results in the lower side of the portion 18 to be extended. When there is a large force which extends the bladder toward the supplying and discharging mouth 14 side due to frictional forces, the thin wall section 5 is extended by a very small force compared to the other portion 18, such that this force is not exerted on the base 6 of the mounting flange 2. Accordingly, even if the bladder 1 expands rapidly, the base 6 of the mounting flange 2 does not break due to fatigue because it does not experience variable stress.

Though the thin wall section 5 of the bladder transmits a slightly larger amount of gas compared to the other portion section 18, it has a small area, for example it accounts for less than 10% of the total bladder area. In addition, the thin wall section, which is placed near the base 6 of the mounting flange 2, comes into close contact with the container main body to restrict the amount of gas which is transmitted. (Except when it very rarely happens that the thin wall section 5 moves away from the container main body 7, depending on the condition of use of the accumulator ACC.) This means that gas transmission, which is minimized, does not actually cause problems.

What is claimed is:

1. A bladder for an accumulator, said bladder being adapted for mounting to an accumulator body and comprising:

an elastic bag portion substantially defined by a wall having a first thickness, said bag portion having an opening at an end;

an integral stress concentration preventing wall section about said bag portion adjacent said opening, said wall section being substantially cylindrical about an axis and having an axial length with a substantially uniform second thickness less than said first thickness; and a mounting flange around the opening and integrally connected to the wall section by a base portion having a third thickness greater than said second thickness;

wherein expansion of said bladder first expands said stress concentration preventing wall section in a circumferential direction into close contact with an inner surface of said accumulator body.

2. The bladder of claim 1, wherein said mounting flange is thicker than said third thickness and said third thickness is greater than said first thickness.

3. The bladder of claim 1, wherein the bag portion surrounds an interior with an inner side of the wall facing said interior, and said stress concentration preventing wall section is formed by depressing the other side of the bag portion wall adjacent said opening.

4. The bladder of claim 1, wherein the bag portion surrounds an interior with an inner side of the wall facing said interior, and said stress concentration preventing wall section is formed by depressing the inner side of the bag portion adjacent said opening.

5. The bladder of claim 1, wherein the bag portion surrounds an interior with an inner side of the wall facing said interior, and said stress concentration preventing wall section is formed by depressing both the inner side and other side of the bag portion adjacent said opening.

6. The bladder of claim 1, wherein said bladder has an inner periphery side with longitudinal ridges spaced at a predetermined interval and having a greater thickness than said first thickness.

7. The bladder of claim 1, wherein the stress concentration preventing wall section is connected to said base portion by a first connecting wall section tapered from said third thickness at said base portion to said second thickness at said stress concentration preventing wall section.

8. The bladder of claim 7, wherein the stress concentration preventing wall section is connected to said bag portion by a second connecting wall section tapered from said first thickness at said bag portion to said second thickness at said stress concentration preventing wall section.

9. The bladder of claim 1, wherein the area of the stress concentration preventing wall section accounts for less than 10% of the total bladder area.

10. A bladder for an accumulator, said bladder being adapted for mounting to an accumulator body and comprising:

an elastic bag portion substantially defined by a wall having a thickness A, said bag portion having an opening at an end;

an integral stress concentration preventing wall section about said bag portion adjacent said opening, said wall section being substantially cylindrical about an axis and having an axial length with a substantially uniform thickness B; and a mounting flange around the opening and integrally connected to the wall section by a base portion having a thickness C;

wherein B<0.65 A; and wherein expansion of said bladder first expands said stress concentration preventing wall section in a circumferential direction into close contact with an inner surface of said accumulator body.

11. The bladder of claim 10, wherein C>A.

12. The bladder of claim 10, wherein the integral stress concentration preventing wall section is connected to the base portion by a first connecting wall section tapered from thickness C at the base portion to a thickness B at the stress concentration preventing wall section.

13. The bladder of claim 10, wherein the bag portion surrounds an interior with an inner side of the wall facing said interior, and said stress concentration preventing wall section is formed by depressing the other side of the bag portion wall adjacent said opening.

14. The bladder of claim 10, wherein the bag portion surrounds an interior with an inner side of the wall facing said interior, and said stress concentration preventing wall section is formed by depressing the inner side of the bag portion adjacent said opening.

15. The bladder of claim 10, wherein the bag portion surrounds an interior with an inner side of the wall facing said interior, and said stress concentration preventing wall section is formed by depressing both the inner side and other side of the bag portion adjacent said opening.

16. The bladder of claim 10, wherein said bladder has an inner periphery side with longitudinal ridges spaced at a predetermined interval and having a greater thickness than said first thickness.

17. The bladder of claim 10, wherein the area of the stress concentration preventing wall section accounts for less than 10% of the total bladder area.

18. The bladder of claim 12, wherein the stress concentration preventing wall section is connected to said bag portion by a second connecting wall section tapered from said thickness A at said bag portion to said thickness B at said stress concentration preventing wall section.

* * * * *